United States Patent [19]

Allen

[11] Patent Number: 5,261,217
[45] Date of Patent: Nov. 16, 1993

[54] CUTTING HEAD FOR LAWN MOWER

[76] Inventor: Frank R. Allen, 405 Harbison Blvd., Timberlake No. 827, Columbia, S.C. 29212

[21] Appl. No.: 986,755

[22] Filed: Dec. 8, 1992

[51] Int. Cl.⁵ .................................... A01D 34/83
[52] U.S. Cl. .................................. 56/244; 56/291
[58] Field of Search ............... 56/16.7, 154, 244, 245, 56/290, 291

[56] References Cited

U.S. PATENT DOCUMENTS

| | | | |
|---|---|---|---|
| 2,728,181 | 12/1955 | Carpenter | 56/244 X |
| 3,006,126 | 10/1961 | Viverette | 56/244 X |
| 3,242,659 | 3/1966 | Dunlap | 56/244 X |
| 3,964,243 | 6/1976 | Knipe | 56/17.5 |
| 4,532,708 | 4/1985 | Mensing | 56/347 |
| 4,916,887 | 4/1990 | Mullet et al. | 56/13.8 |
| 5,012,635 | 5/1991 | Walters et al. | 56/13.6 |
| 5,019,113 | 5/1991 | Burnell | 56/295 |

FOREIGN PATENT DOCUMENTS 122297 4/1931 Fed. Rep. of Germany ........ 56/291
1915534 11/1980 Fed. Rep. of Germany ........ 56/244

Primary Examiner—David J. Bagnell
Attorney, Agent, or Firm—Michael A. Mann; Maria Reichmanis

[57] ABSTRACT

A cutter head, for a non-rotary power lawn mower, having a multiple-blade, multiple levels of blades assembly. The cutter head includes a stationary assembly in the form of a plurality of fingers arranged in several levels that cooperate with a continuous plurality of blades moved by a blade-carrying assembly. The fingers preferably extend parallel to the lawn mower's direction of motion in order to catch the grass and set it up for cutting. The blade-carrying assembly is preferably a chain conveyed around a pair of sprockets that carry the plurality of blades. These blades are arranged in several levels and interleave several levels of fingers. The grass entering the spacing between the fingers is sheared at each level of the stationary assembly by movement of the blades across the fingers. The cut grass is directed to the rear area of the cutter head, where it falls below the cutter head as mulch.

18 Claims, 5 Drawing Sheets

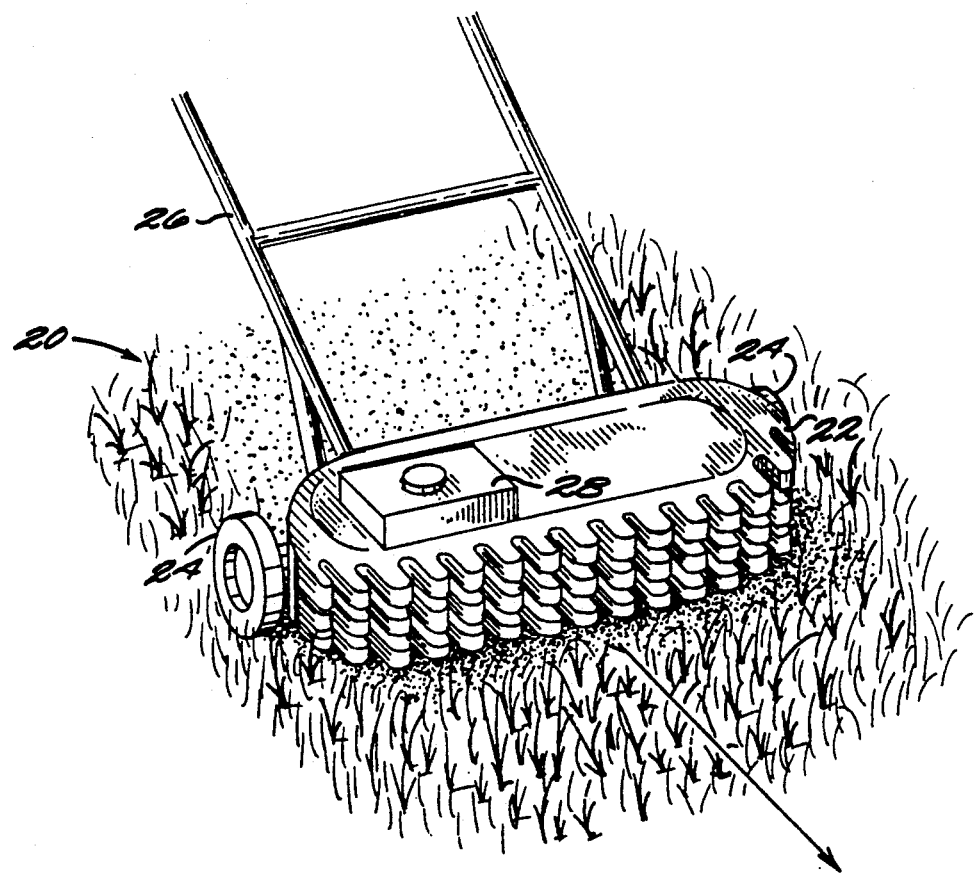

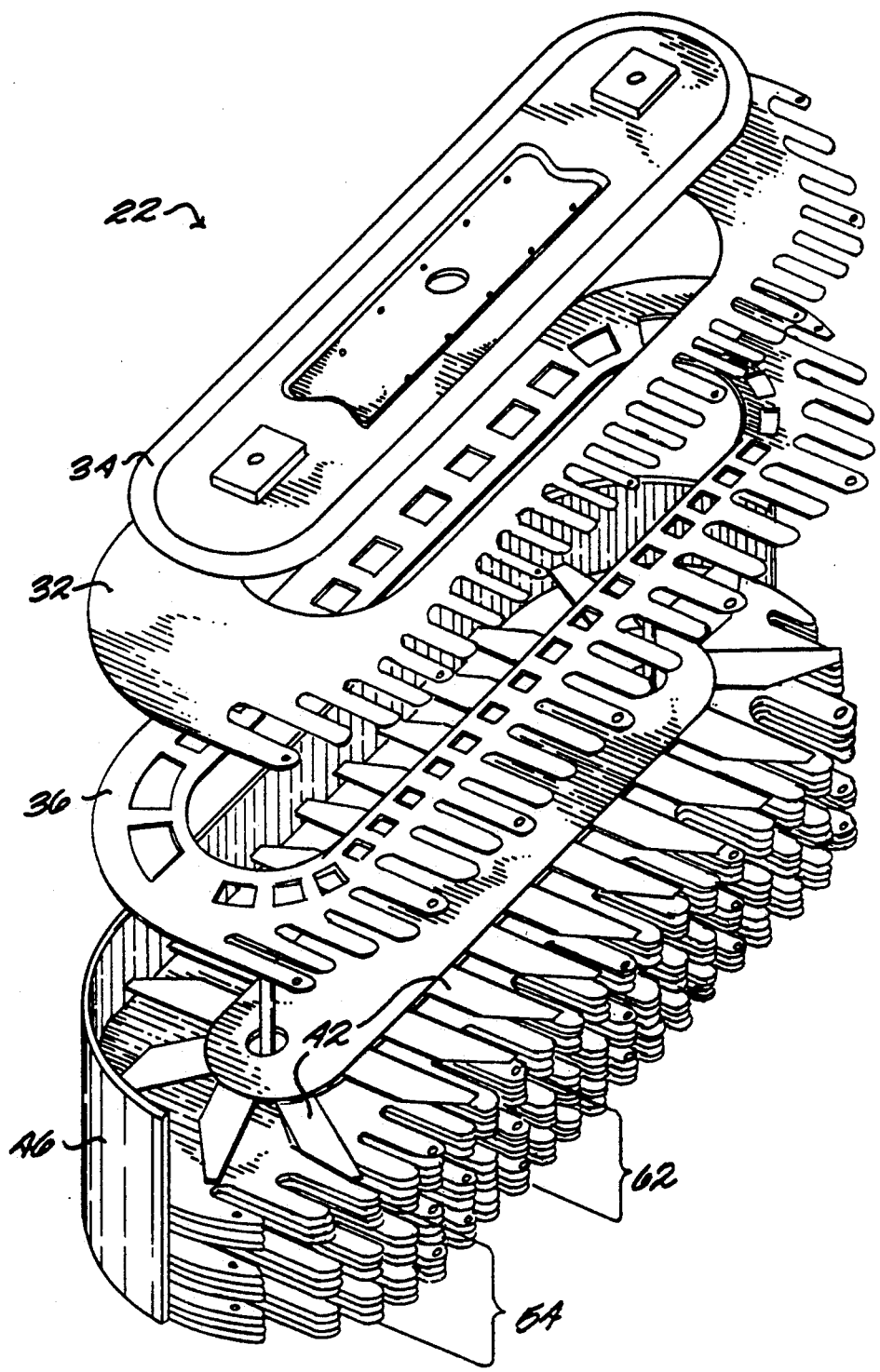

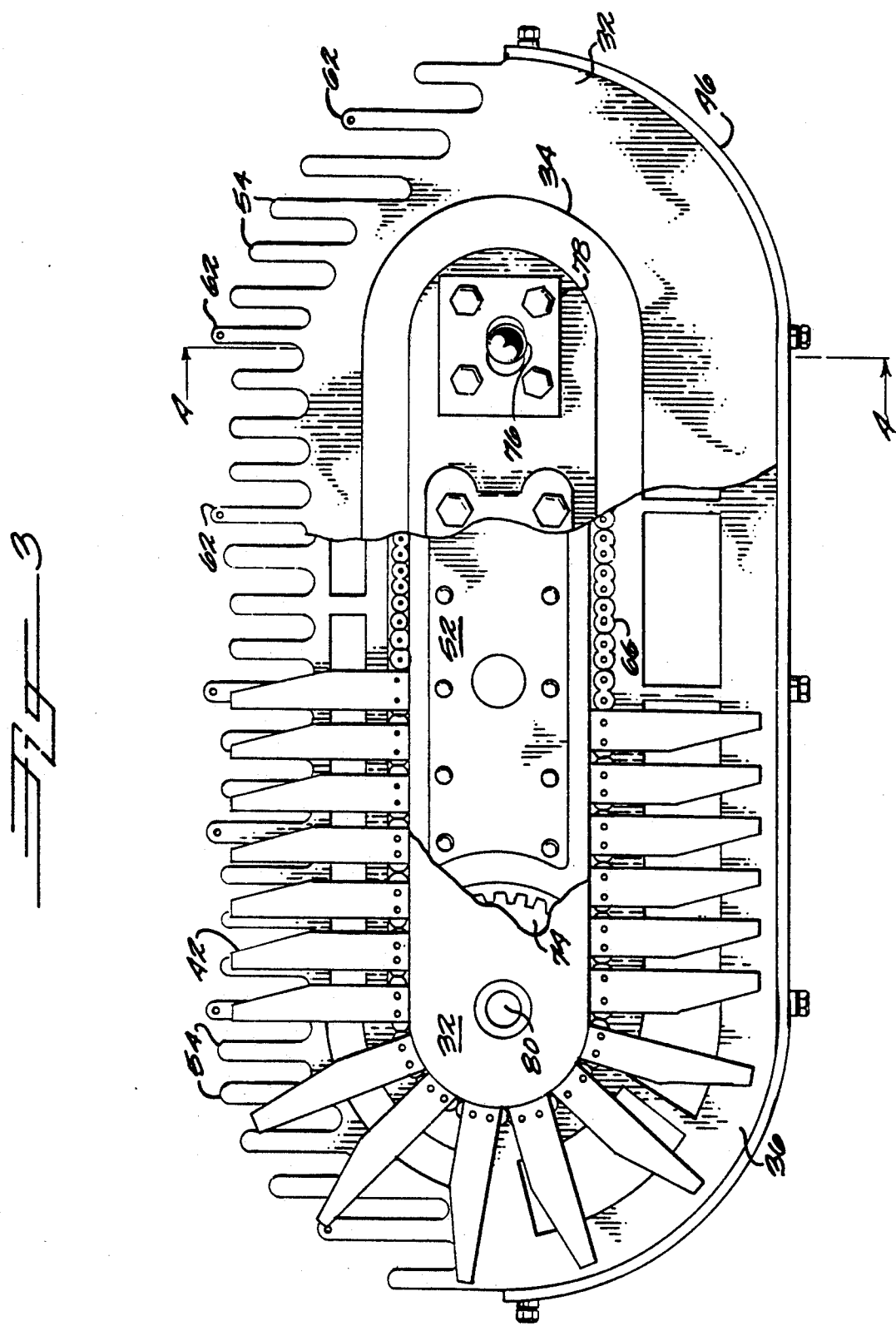

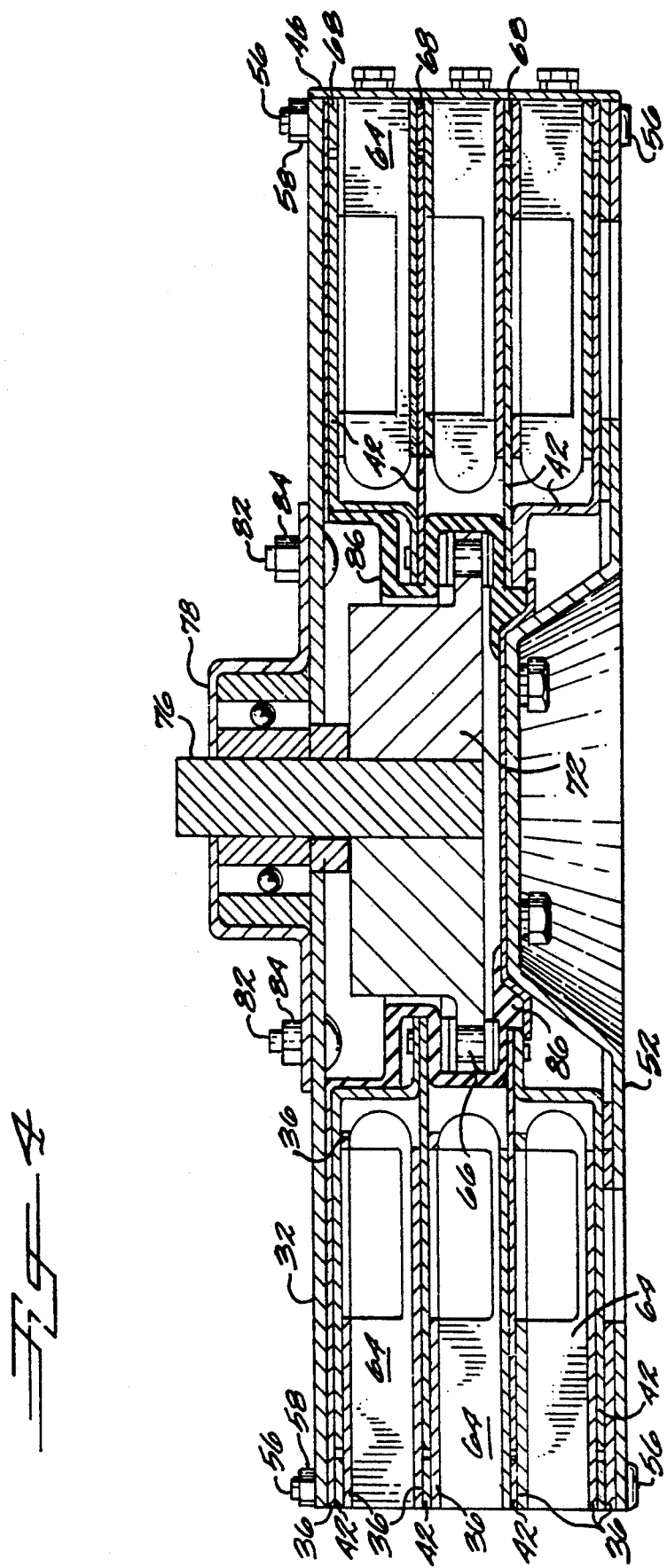

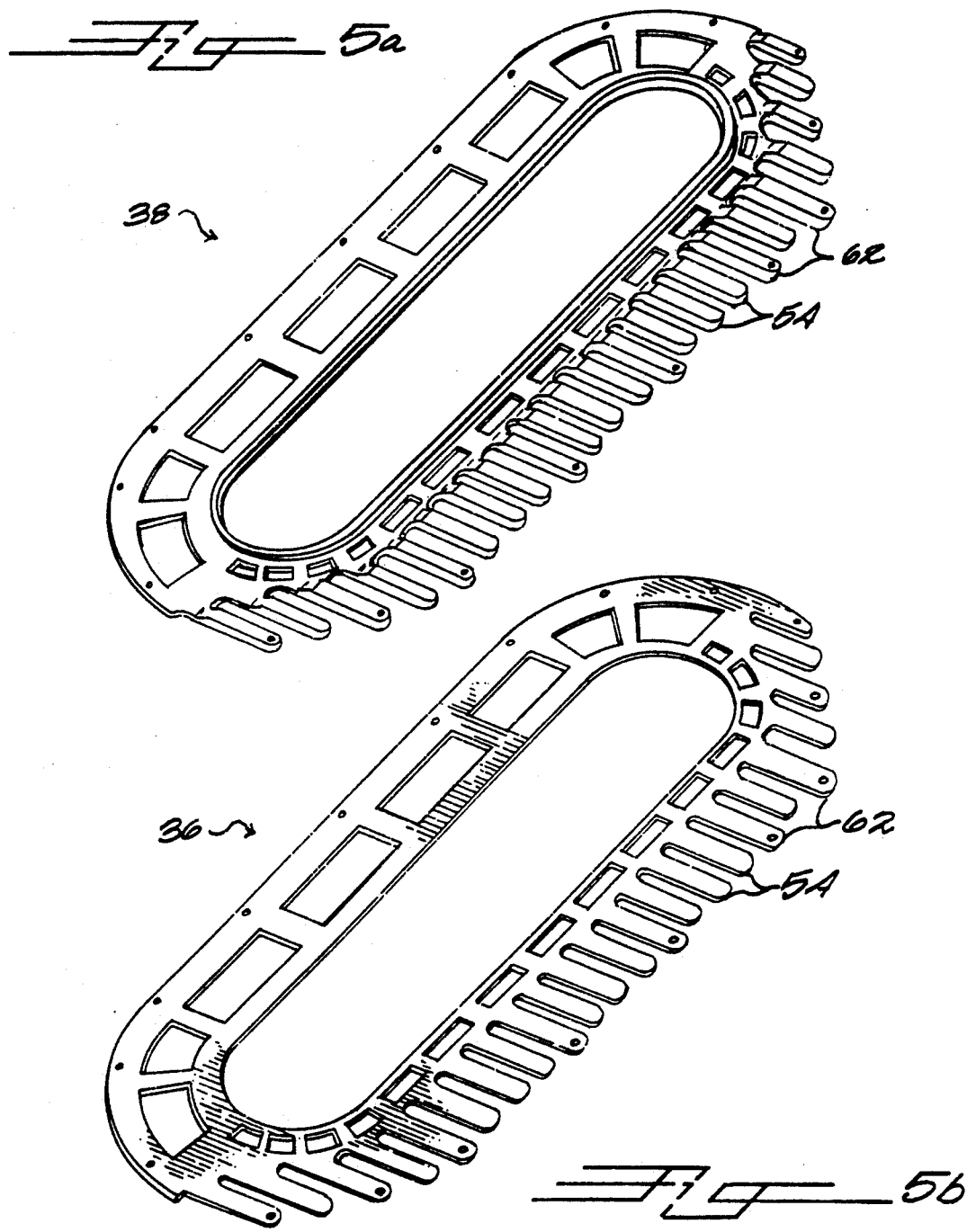

CUTTING HEAD FOR LAWN MOWER

BACKGROUND OF THE INVENTION

1. Field of the Invention:

The present invention relates to lawn mowing and mulching devices. More particularly, the present invention relates to a cutter head for use with a non-rotary, power lawn mower.

2. Discussion of Background:

Lawn mowers are well known devices used for cutting grass to maintain the appearance of an area. There are many types of lawn mowers, including rotary mowers and reel mowers. Lawn mowers featuring additional functions, such as mulching, collecting grass clippings, and the like, are also well known. Additionally, many different cutting blades or cutter heads are known for use with lawn mowing devices.

The most widely known lawn mower in use is the power rotary lawn mower having a single rotating blade with cutting edges at opposing distal ends of the blade. The cutting blade rotates at high speed within a circular housing to both cut the grass and create an upward draft to urge the blades of grass to stand upward for better cutting. The power mower housing functions to prevent injury to the user and to control the direction of discharge of grass clippings and other debris encountered during mower operation.

Normally, the cutting blade is centrally mounted on a shaft extending vertically through the housing from a gasoline or electric powered motor secured on the top of the housing. The motor causes the cutting blade to be rotated at high speeds, causing the grass immediately under the housing to be clipped.

Different rotary cutting blade configurations for power lawn mowers are used for a variety of reasons. For example, Burnell, in U.S. Pat. No. 5,019,113, discloses a rotary lawn mower blade assembly having easily detachable replacement blades. Mensing, in U.S. Pat. No. 4,532,708, discloses a blade assembly with a plurality of cutting segments arranged end to end for improved cutting. Also, in U.S. Pat. No. 3,964,243, Knipe features a rotary cutting blade with detachable tines used to blow grass clippings from the mower path.

Mullet et al, in U.S. Pat. No. 4,916,887, discloses a rotary mulching mower. The mower has a plurality of cutting blades rotatably positioned in a housing for producing mulch. Each cutting blade rotates through a different plane within the housing for cutting the grass clippings into a fine mulch.

The most significant problem with conventional rotary mowers is the inherent danger presented by a high-speed whirling blade. The blade is a direct threat if the user comes into contact with it, and an indirect threat if it propels an object from the housing. Furthermore, since the blade must be exposed to the grass, even the housing that covers it to protect the user is of no help if the mower overturns. Numerous safety features attempt to minimize the threat of direct and indirect injury from the blade.

Several problems exist with current rotary lawn mowers having rotary blades. Rocks, limbs, roots and other foreign debris entering the housing can damage the rotary blades or be suddenly propelled from the housing. Also, the blades become extremely dull and tend to rip and tear the grass rather than cut it cleanly. In sandy soil, the blades erode very rapidly. Thus, the blades have to be frequently replaced or sharpened.

In tall grass, a conventional mower bends the grass as the mower housing passes over it. If the grass is very long, the housing will hold it to the ground so that it is not cut.

Another problem with current rotary lawn mowers is the relatively slow speed at which the mower can travel across a lawn or other grass area to be cut. Even when rotating at high speeds, a single blade with 2 cutting edges requires the lawn mower to travel at very low speeds. Thus, it takes a substantial amount of time to mow large areas of grass.

It is believed that no present lawn mowing device addresses these problems sufficiently.

SUMMARY OF THE INVENTION

According to its major aspects and broadly stated, the present invention is a non-rotary, power lawn mower. In particular, it is a cutter head with a multiple-blade assembly. The cutter head includes a stationary assembly in the form of a plurality of fingers arranged in several levels that cooperate with a continuously moving plurality of blades. The blades are moved by a blade-carrying assembly and sweep past the fingers. The fingers are oriented parallel to the lawn mower's direction of motion in order to catch the grass in the spaces between them and set the grass up for cutting. The blade-carrying assembly is preferably a chain conveyed around a pair of sprockets that carry the plurality of blades in a non-circular motion. These blades are arranged in several levels and interleave several levels of fingers. The grass entering the spacing between the fingers is sheared at each level of the stationary assembly by movement of the blades across the fingers. The grass clippings are directed to the rear area of the cutter head, where they fall below the cutter head to be used as mulch.

A major feature of the present invention is the cooperation of the plurality of blades with the fingers to shear grass entering the spaces between the fingers. The fingers are spaced apart to catch grass, even tall grass, entering between them during movement of the mower and to set up the entering grass for the moving blades to shear. The advantage of this feature is that grass is cut more cleanly and evenly, rather than being torn or pulled by conventional rotary mowers, since the grass is being set up in a cutting position mechanically rather than by the vacuum of a single, whirling blade. Cutting each blade more than once for mulching eliminates the need for bagging the grass. Also, the absence of the intake of air around the periphery of the mower reduces the amount of dirt and sand stirred up by the mower.

Another feature of the present invention is the use of a plurality of blades moved by a chain and sprocket system. Because a plurality of blades are used, the mower can move much faster across an area of grass and still cut the grass. The preferred rate of transverse cutting speed allows the mower to cut grass in excess of 5 miles per hour, compared to limited mowing speed for current rotary mowers. The increased number of blades allows a clean, even cut with a blade tip speed much lower than that of a single-blade power mower, thus reducing the possibility of throwing objects from the housing. Finally, because the speed of the blades can be much slower while still providing effective cutting, the present mower is much safer than conventional rotary mowers.

Still another feature is the use of multiple layers of cutting blades. The blades are preferably configured into four horizontal cutting layers wherein the blades of each layer may be vertically aligned or staggered from layer to layer. This feature cuts each blade of grass in several places for mulching. Also, one or more of the layers of cutting blades can be removed or added for changing the length of clipped segments of grass.

Yet another feature is the spacing of the fingers extending from the stationary assemblies. Relatively narrow spacing keeps larger objects, such as rocks, from entering the cutter head yet allows grass to enter the cutter head to be sheared. Further, by significantly reducing the possibility of throwing objects from under the mower, the possibility of damage or injury from thrown objects is correspondingly reduced.

Still another feature is the seal surrounding the chain and sprockets. The seal is flexible and rotates with the blades to protect the drive components from dust and dirt and prevents fouling of lubricating oils if used, thus prolonging the useful life of the mower.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a power lawn mower featuring a cutter head according to a preferred embodiment of the present invention;

FIG. 2 is a partially exploded, perspective view of the first layer of components of the cutter head according to a preferred embodiment of the present invention;

FIG. 3 is a partial cut-away view of the cutter head according to a preferred embodiment of the present invention;

FIG. 4 is a cross-sectional view of the cutter head taken along lines 4—4 of FIG. 3;

FIG. 5a is a perspective view of the stationary cutter bar of the cutter head according to a preferred embodiment of the present invention; and FIG. 5b is a perspective view of a wear plate according to a preferred embodiment of the present invention.

DETAILED DESCRIPTION OF A PREFERRED EMBODIMENT

In the following description similar components are referred to by the same reference numeral in order to simplify the understanding of the sequential aspect of the drawings.

Referring now to FIG. 1, the non-rotary power lawn mower 20 in its preferred embodiment comprises a cutter head 22 preferably attached to wheels 24 and handle 26. Also, cutter head 22 is powered by an electric motor or gasoline engine 28. Mower 20 moves in the direction indicated by the arrow.

In FIG. 2, a partially exploded view of cutter head 22 is shown. Cutter head 22 is assembled from a series of layers, including a top plate 32, a top plate cover 34 and a stationary assembly or wear plate 36. Alternatively, top plate 32 can be formed to include top plate cover 34 thereby combining top plate 32 and top plate cover 34 into one assembly.

Referring to FIGS. 2, 3, 4 and 5b, plurality of blades 42, assembled together in a series of horizontal sets, is positioned in close proximity to wear plates 36. Preferably, each horizontal set of blades 42 is positioned between a pair of wear plates 36. The number of horizontal sets of blades 42, and corresponding wear plates 36, can be varied depending on the application of cutter head 22. Also, a shroud 46, preferably a metal plate, is positioned vertically along the rear of cutter head 22. Unlike conventional rotary mowers, no heavy deck is needed with a mower according to the present invention to house blades 42; the shroud is sufficient.

In addition to top plate 32, top plate cover 34 and wear plate 36, cutter head 22 further comprises a bottom plate 52. Extending from the front of each of top plate 32, wear plate 36 and bottom plate 52 is a plurality of fingers 54, spaced apart and laying with their major direction parallel to the preferred direction of motion of cutter head 22 (see arrow in FIG. 1).

Top plate 32, top plate cover 34, bottom plate 52, and each wear plate 36 are aligned and secured by a plurality of clamping bolts 56 and nuts 58. Clamping bolts 56 pass vertically through clamping fingers 62, which are slightly longer than fingers 54, and along the rear area of each plate.

Appropriate spacing within cutter head 22 is maintained by a series of stationary cutterbars 64 and spacers 68. Wear plates 36 are attached to the upper and lower surface of each cutterbar 64, allowing each cutterbar 64 to be positioned between a pair of vertically positioned blades 42. Each cutterbar 64 establishes a level line for a series of blades 42 to cut the grass. Spacers 68 maintain the distance between wear plates 36 so that blades 42 can pass between adjacent plates 36. Blades 42 will not easily get out of alignment or out of balance in the configuration of the present invention.

Blades 42 are preferably assembled together on a chain 66, or other conveyor such as a belt and pulleys, so that, during operation of cutter head 22, blades 42 move endlessly across fingers 54, 62 in a single direction. Chain 66 engages and rotates continuously around a pair of horizontally mounted sprockets: a driving sprocket 72 (see FIG. 4) and a driven sprocket 74 (see FIG. 3). Chain 66 is preferably a number 40 extended pitch with oil impregnated bushings; sprockets 72 and 74 preferably have 19 teeth.

Driving sprocket 72 is connected to a vertically-oriented driving shaft 76 that is preferably connected to and driven by motor 28 (FIG. 1). Driven sprocket 74 rotates around a vertically-oriented driven shaft 80 in order to keep chain 66 moving continuously during operation. Bearings (not shown) assist driving shaft 76 in its rotational operation, and are contained within a bearing retainer 78. Bearing retainer 78 is connected to top plate 32 with bolts 82 and nuts 84, and maintains the positioning of the bearings with respect to driving shaft 76.

Blades 42 are preferably displaced vertically in sets (see especially FIG. 4) corresponding to each level or layer of wear plate 36. With three layers, a set of four blades 42 are vertically aligned, as shown, or staggered and connected to the same position along the conveyor, such as along the same link of chain 66. Alternatively, each vertical set of blades 42 can be staggered.

A seal 86, preferably made of flexible plastic or a comparable material, is mounted along chain 66 to prevent dust, dirt and grass from entering the sprocket housing formed by cover 86. The sprocket housing formed by seal 86 may hold a quantity of a lubricating fluid for smoother operation of chain 66 along sprockets 72, 74, or, alternatively, chain 66 may be made of a self-lubricating plastic or ceramic.

At least one layer of wear plates 36 is provided for isolating blades 42 from both top plate 32 and bottom plate 52, thereby prolonging the useful life of the cutter head 22. Also, shroud 46, mounted vertically along the rear portion of cutter head 22, prevents clipped grass from escaping cutter head 22 except through a series of openings along the lower rear area of cutter head 22.

In use, engine 28 (see FIG. 1), attached to the top of top plate 32, is operated to rotate driving shaft 76. Driving shaft 76 conveys chain 66 so that blades 42, carried by chain 66, move endlessly across wear plates 36 when engine 28 is running and turning chain 66.

Once chain 66, carrying blades 42, is rotating around sprockets 72, 74, lawn mower 20 moves across an area of grass to be cut. As lawn mower 20 moves in a direction of motion over an area of grass, fingers 54, 62, extending parallel to the direction of motion, the blades of grass enter mower 20 in the spaces between fingers 54, 62 which fingers capture and set up the grass for cutting.

As grass enters the spacing between fingers 54, 62, blades 42 moving across fingers 54, 62 shear the entering grass at each vertical level where a blade/wear plate pair exists. The grass is cut cleanly and evenly at each level, unlike rotary mowers that tend to pull and tear the grass. Any grass not cut by this initial pass will subsequently be cut by blades 42 passing along the rear area bottom plate 52. The freshly cut grass clippings fall below cutter head 22 through the openings provided in the front and rear areas of bottom plate 52.

The distance between the axes of rotation of driving sprocket 72 and driven sprocket 74 can be made as large as desired for mowers capable of mowing a wider path. For a wider mower 20, chain 66 would be longer and more blades 42 would be used but blades 42 would be the same size as for a smaller mower 20 as well as blade tip speed, engine RPM, external drive speed ratio or number of sprocket teeth. A conventional power rotary mower requires more horsepower per inch of width than a mower according to the present invention.

Because of the design, "scalping" a lawn is avoided, rather, floating or contour cutting and cutting close to boundaries is made possible by the oval cutting path of the blades for trimming. Furthermore, in addition to forming mulch of the cut grass, a mower according to the present invention leaves topsoil in place because it relies on the fingers to set up and capture the grass rather than a vacuum from a high-speed blade that vacuums up soil particles and sand.

The present mower is safer than conventional power mowers because it is much more difficult to have serious injuries to arms or legs. Objects cannot be propelled at high speed from the mower. It is much more difficult for a user to come into contact with the blades. Furthermore, the blades will stay sharper longer because large objects cannot enter between the fingers of the mower.

It will be apparent to those skilled in the art that many changes and substitutions can be made to the preferred embodiment herein described without departing from the spirit and scope of the present invention as defined by the appended claims.

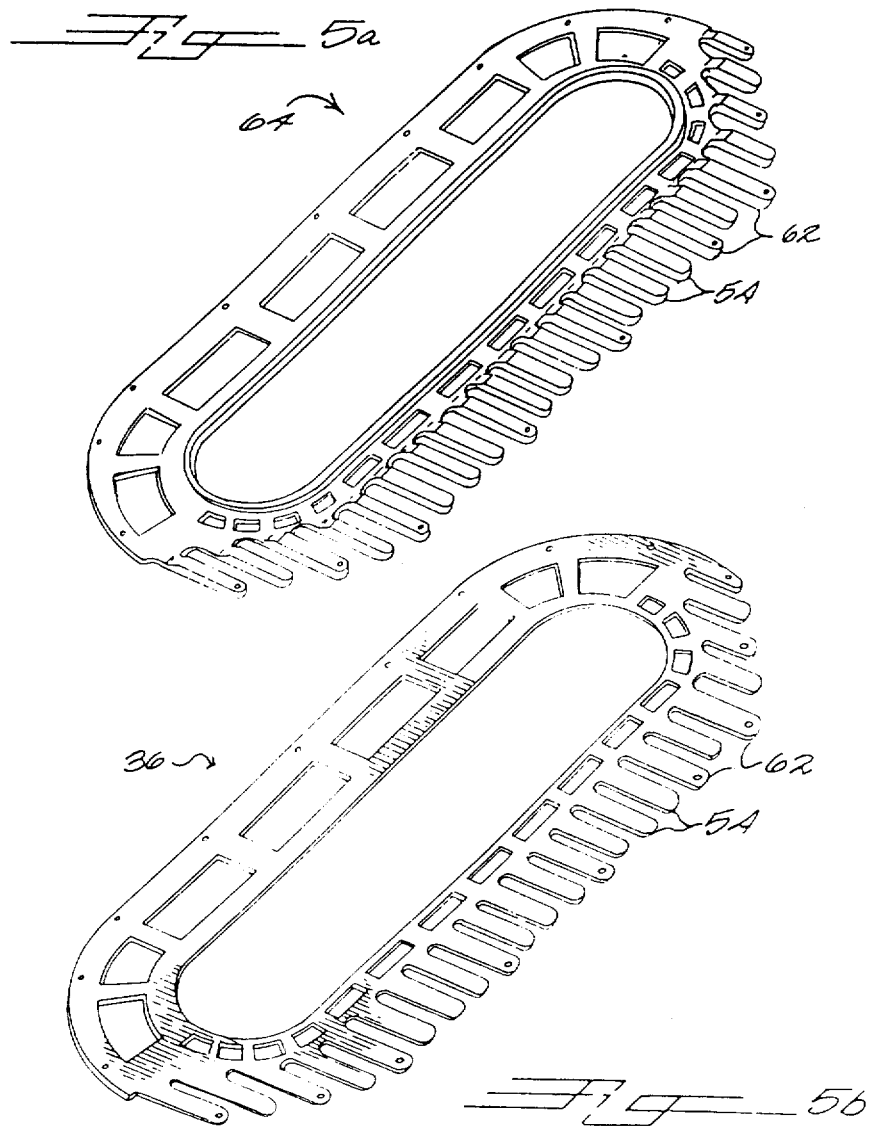

What is claimed is:

1. Apparatus for cutting grass, said apparatus for moving in a direction across said grass, said apparatus comprising:

an assembly having a plurality of spaced-apart fingers, said fingers having a major dimension parallel to said direction so that, as said assembly crosses said grass, said grass enters said assembly between said spaced-apart fingers;

a plurality of blades; and means attached to said assembly for conveying said blades past said fingers so that said grass entering said assembly between said fingers is cut by said blades, said blades attached to said conveying means, said conveying means having an endless conveyor, a driving sprocket, a driven sprocket spaced apart from said driving sprocket, said endless conveyor being moved by said driving sprocket and moving about said driven sprocket, and sealing means attached to said endless conveyor for separating said conveyor and said sprockets from said plurality of blades.

2. The apparatus as recited in claim 1, wherein said endless conveyor is selected from the group consisting of a linked chain and a belt.

3. The apparatus as recited in claim 1, wherein said conveying means further comprises:

a drive shaft attached to said assembly for turning said driving sprocket; and means in operative connection with said drive shaft for turning said drive shaft so that said endless conveyor moves about said driven sprocket.

4. The apparatus as recited in claim 1, wherein each of said plurality of blades has a cutting edge moving at an angle so that one part of said cutting edge passes across one of said fingers before another part of said cutting edge thereby shear-cutting said grass between said spaced-apart fingers.

5. The apparatus as recited in claim 1, wherein each of said spaced-apart fingers has a wear surface protecting each of said fingers from said passing blades.

6. The apparatus as recited in claim 1, wherein said assembly further comprises a bottom plate having means formed therein for allowing said cut grass to fall from said assembly.

7. Apparatus for cutting grass, said apparatus for use with means for moving said apparatus in a direction along said grass, said apparatus comprising:

an assembly having more than one set of fingers, each finger of each set of fingers spaced apart from each other finger, each set of said more than one set of fingers spaced apart from each other set, each finger of each set of said more than one set of fingers having a major dimension parallel to said direction so that, as said assembly moves across said grass, said grass enters said assembly between said spaced-apart fingers of at least one of said more than one set of fingers;

at least one set of blades; and means attached to said assembly for conveying said at least one set of blades between adjacent sets of said more than one set of fingers so that said grass entering said assembly between said spaced-apart fingers is cut by said passing blades, said at least one set of blades attached to said conveying means, said conveying means having an endless conveyor, a driving sprocket, a driven sprocket spaced apart from said driving sprocket, said endless conveyor being moved by said driving sprocket and moving about said driven sprocket, and sealing means attached to said endless conveyor for separating said conveyor and said sprockets from said at least one set of blades.

8. The apparatus as recited in claim 7, wherein said endless conveyor is selected from the group consisting of a linked chain and a belt.

9. The apparatus as recited in claim 7, wherein said conveying means further comprises:

a drive shaft connected to said assembly for turning said driving sprocket; and means in operative connection with said drive shaft for turning said drive shaft so that said endless conveyor moves about said driven sprocket.

10. The apparatus as recited in claim 7, wherein each blade of said at least one set of blades has a cutting edge moving at an angle so that one part of said cutting edge passes across one finger of said more than one set of fingers before another part of said cutting edge thereby shear-cutting said grass between said spaced-apart fingers.

11. The apparatus as recited in claim 7, wherein each finger of said more than one sets of spaced-apart fingers has a wear surface protecting said each fingers from said passing blades.

12. The apparatus as recited in claim 7, wherein said assembly further comprises a bottom plate having means formed therein for allowing said cut grass to fall from said assembly.

13. The apparatus as recited in claim 7, wherein said blade sets of said at least one set of blades are vertically aligned into a series of horizontal sets and positioned so that each set of blades is interleaved between two sets of said more than one set of fingers.

14. Apparatus for cutting grass, said apparatus comprising:

a frame;

an assembly attached to said frame having more than one set of fingers, each finger of said more than one set of fingers spaced apart from each other finger and having a major dimension parallel to said direction so that, as said assembly is moved across said grass, said grass enters said assembly between said spaced-apart fingers;

at least one set of blades mounted on said frame, said blade sets vertically aligned into a series of horizontal sets and positioned so that each set of blades is interleaved between two sets of said more than one set of fingers;

means attached to said frame for conveying said set of blades past said set of fingers so that said grass entering said assembly between said spaced-apart fingers is cut by said passing blades, said at least one set of blades attached to said conveying means;

a motor driving said conveying means; and a plurality of ground-engaging wheels attached to said frame.

15. The apparatus as recited in claim 14, wherein said conveying means further comprises:

an endless conveyor;

a driving sprocket;

a driven sprocket spaced apart from said driving sprocket, said endless conveyor being moved by said driving sprocket and moving about said driven sprocket; and sealing means connected to said endless conveyor for isolating said conveyor and said sprockets from said at least one set of blades.

16. The apparatus as recited in claim 14, wherein said conveying means further comprises:

an endless conveyor; and a carrier for holding said at least one set of blades, said blades molded to said carrier.

17. The apparatus as recited in claim 14, wherein each blade of said set of blades has a cutting edge held at an angle with respect to said major dimension of said finger so that one part of said cutting edge moves across said finger before another part of said cutting edge thereby shear-cutting said grass between said spaced-apart fingers.

18. The apparatus as recited in claim 14, wherein said assembly further comprises a bottom plate having means formed therein for allowing said cut grass to fall from said assembly.

* * * * *

UNITED STATES PATENT AND TRADEMARK OFFICE
CERTIFICATE OF CORRECTION

PATENT NO. : 5,261,217  
DATED : Nov. 16, 1993  
INVENTOR(S) : Frank R. Allen

Page 1 of 2

It is certified that error appears in the above-indentified patent and that said Letters Patent is hereby corrected as shown below:

The drawing sheet, consisting of Fig. 5a, should be deleted to be replaced with the drawing sheet, consisting of Fig. 5a, as shown on the attached page.

Signed and Sealed this

Twenty-ninth Day of March, 1994

Attest:

BRUCE LEHMAN

*Attesting Officer*       *Commissioner of Patents and Trademarks*